United States Patent
Ibe et al.

(10) Patent No.: US 8,841,885 B2
(45) Date of Patent: Sep. 23, 2014

(54) INFORMATION PROCESSING DEVICE

(75) Inventors: Yukiyasu Ibe, Kanagawa (JP); Teppei Hamada, Kanagawa (JP); Taeko Satoh, Kanagawa (JP); Takeshi Sasaki, Kanagawa (JP); Takeshi Miyaji, Kanagawa (JP); Yu Yamamoto, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 14/006,878

(22) PCT Filed: Sep. 2, 2011

(86) PCT No.: PCT/JP2011/070545
§ 371 (c)(1),
(2), (4) Date: Sep. 23, 2013

(87) PCT Pub. No.: WO2012/127712
PCT Pub. Date: Sep. 27, 2012

(65) Prior Publication Data
US 2014/0009119 A1  Jan. 9, 2014

(30) Foreign Application Priority Data
Mar. 24, 2011  (JP) .................................. 2011-065367

(51) Int. Cl.
*H02J 7/00* (2006.01)
*H01M 10/44* (2006.01)

(52) U.S. Cl.
CPC .............. *H02J 7/00* (2013.01); *H01M 10/441* (2013.01); *Y02E 60/12* (2013.01)
USPC ............................ 320/134; 320/149; 320/155

(58) Field of Classification Search
CPC ...................................................... H02J 7/0093
USPC ........................................... 320/134, 149, 155
See application file for complete search history.

(56) References Cited

U.S. PATENT DOCUMENTS 6,587,799 B2    7/2003  Suzuki et al.
7,494,729 B2 *  2/2009  Odaohhara ....................... 429/9
(Continued)

FOREIGN PATENT DOCUMENTS

JP   2000-260486     *   9/2000
JP   2000-260486  A       9/2000
(Continued)

OTHER PUBLICATIONS

International Search Report for PCT/JP2011/070545 dated Dec. 20, 2011.

*Primary Examiner* — Yalkew Fantu
(74) *Attorney, Agent, or Firm* — Sughrue Mion, PLLC (57) ABSTRACT

Provided is an information processing device capable of easily determining the number of times of charge/discharge of each of a plurality of secondary battery packs, the information processing device including a charge/discharge execution unit (21, 22, 23) having the following configuration. That is, the charge/discharge execution unit (21, 22, 23) determines the number of times of charge/discharge of each of a plurality of secondary battery packs (11, 12, 13) based on: the number of times a fully-charged state of the secondary battery pack is detected when the charge to the secondary battery pack is executed; the number of times an intermediate state in which the remaining capacity of the secondary battery pack becomes equal to a predetermined value between the maximum remaining capacity value in the fully-charged state and a remaining capacity of zero is detected when the discharge from the secondary battery pack is executed; and the number of times a remaining capacity near-zero state in which the remaining capacity of the secondary battery pack becomes equal to a near-zero value closer to the remaining capacity of zero than the predetermined value is detected when the discharge from the secondary battery pack is executed.

7 Claims, 4 Drawing Sheets

(56) References Cited

U.S. PATENT DOCUMENTS

2003/0160594 A1* 8/2003 Trinh et al. ............... 320/156
2005/0116686 A1* 6/2005 Odaohhara ............... 320/116
2008/0290833 A1* 11/2008 Hayashi ................... 320/106
2009/0243548 A1* 10/2009 Hoff ......................... 320/150
2010/0285339 A1* 11/2010 Chaturvedi et al. ........ 429/61
2011/0309681 A1* 12/2011 Kamijima ................. 307/66

FOREIGN PATENT DOCUMENTS

| JP | 2005-168103 A | 6/2005 |
| JP | 2009-159761 A | 7/2009 |
| JP | 2009-240154 A | 10/2009 |

* cited by examiner

INFORMATION PROCESSING DEVICE

CROSS REFERENCE TO RELATED APPLICATIONS

This application is a National Stage of International Application No. PCT/JP2011/070545 filed Sep. 2, 2011, claiming priority based on Japanese Patent Application No. 2011-065367 filed Mar. 24, 2011, the contents of all of which are incorporated herein by reference in their entirety.

TECHNICAL FIELD

This invention relates to an information processing device including a plurality of secondary battery packs.

BACKGROUND ART

In general, in an information processing device equipped with a plurality of secondary battery packs, the plurality of secondary battery packs are defined by name such as "first battery" and "second battery", and a technology of performing charge and discharge so that the first battery may be preferentially used is employed. The secondary battery pack has such characteristics that deterioration is advanced through the repeated charge and discharge. Thus, if the above-mentioned technology is applied, the first battery is preferentially charged and discharged repeatedly, and hence the first battery deteriorates more as compared with other batteries.

In the case where the information processing device is a product for which the secondary battery packs are easily removed and mounted, it is relatively easy work to replace only a secondary battery pack corresponding to the deteriorated first battery.

However, in the case where the information processing device is an embedded device in which a plurality of secondary battery packs are embedded, the secondary battery packs may not easily be removed and mounted. For such an embedded device, it is desired in view of simple maintenance that the plurality of secondary battery packs become deteriorated at as close to the same level as possible, and the plurality of secondary battery packs can be replaced at the same timing.

Patent Literature 1 (Japanese Unexamined Patent Application Publication (JP-A) No. 2005-168103) discloses in paragraph [0046] that switching control is implemented in a dual battery system so that the numbers of charge/discharge cycles of a main battery 52 and a second battery 53 may be equal to each other.

Patent Literature 1 further discloses in paragraph [0034] that a CPU 120 converts observed voltage and current values into the number of cycles and thereby grasps the number of charge/discharge cycles.

PATENT LITERATURE

Patent Literature 1: Japanese Unexamined Patent Application Publication (JP-A) No. 2005-168103

DISCLOSURE OF THE INVENTION

Problem to be Solved by the Invention

As described above, in Patent Literature 1, the number of charge/discharge cycles is grasped by converting the observed voltage and current values into the number of cycles. Patent Literature 1, however, fails to disclose a specific method of determining the number of times of charge/discharge of each of a plurality of secondary battery packs.

It is an object of this invention to provide an information processing device that is configured to execute discharge by selecting one of a plurality of secondary battery packs based on the number of times of charge/discharge of each of the plurality of secondary battery packs and executing the discharge from the selected secondary battery pack, the information processing device being capable of easily determining the number of times of charge/discharge of each of the plurality of secondary battery packs.

Means to Solve the Problem

According to the present invention, there is provided an information processing device, including:
a plurality of secondary battery packs; and
a charge/discharge execution unit for executing charge to the plurality of secondary battery packs and discharge from the plurality of secondary battery packs,
the charge/discharge execution unit being configured to, when executing the discharge, select one of the plurality of secondary battery packs as a selected secondary battery pack based on a number of times of charge/discharge of each of the plurality of secondary battery packs, and execute the discharge from the selected secondary battery pack,
in which the charge/discharge execution unit is configured to determine the number of times of charge/discharge of the each of the plurality of secondary battery packs based on:
a number of times a fully-charged state of the each of the plurality of secondary battery packs is detected when the charge to the each of the plurality of secondary battery packs is executed;
a number of times an intermediate state in which a remaining capacity of the each of the plurality of secondary battery packs becomes equal to a predetermined value between a maximum remaining capacity value in the fully-charged state and a remaining capacity of zero is detected when the discharge from the each of the plurality of secondary battery packs is executed; and
a number of times a remaining capacity near-zero state in which the remaining capacity of the each of the plurality of secondary battery packs becomes equal to a near-zero value closer to the remaining capacity of zero than the predetermined value is detected when the discharge from the each of the plurality of secondary battery packs is executed.

Effect of the Invention

According to the present invention, there is an effect that the number of times of charge/discharge of each of the plurality of secondary battery packs can be easily determined

BEST MODE FOR EMBODYING THE INVENTION

Next, embodiments of this invention are described in detail.

(First Embodiment)

Figure 1:
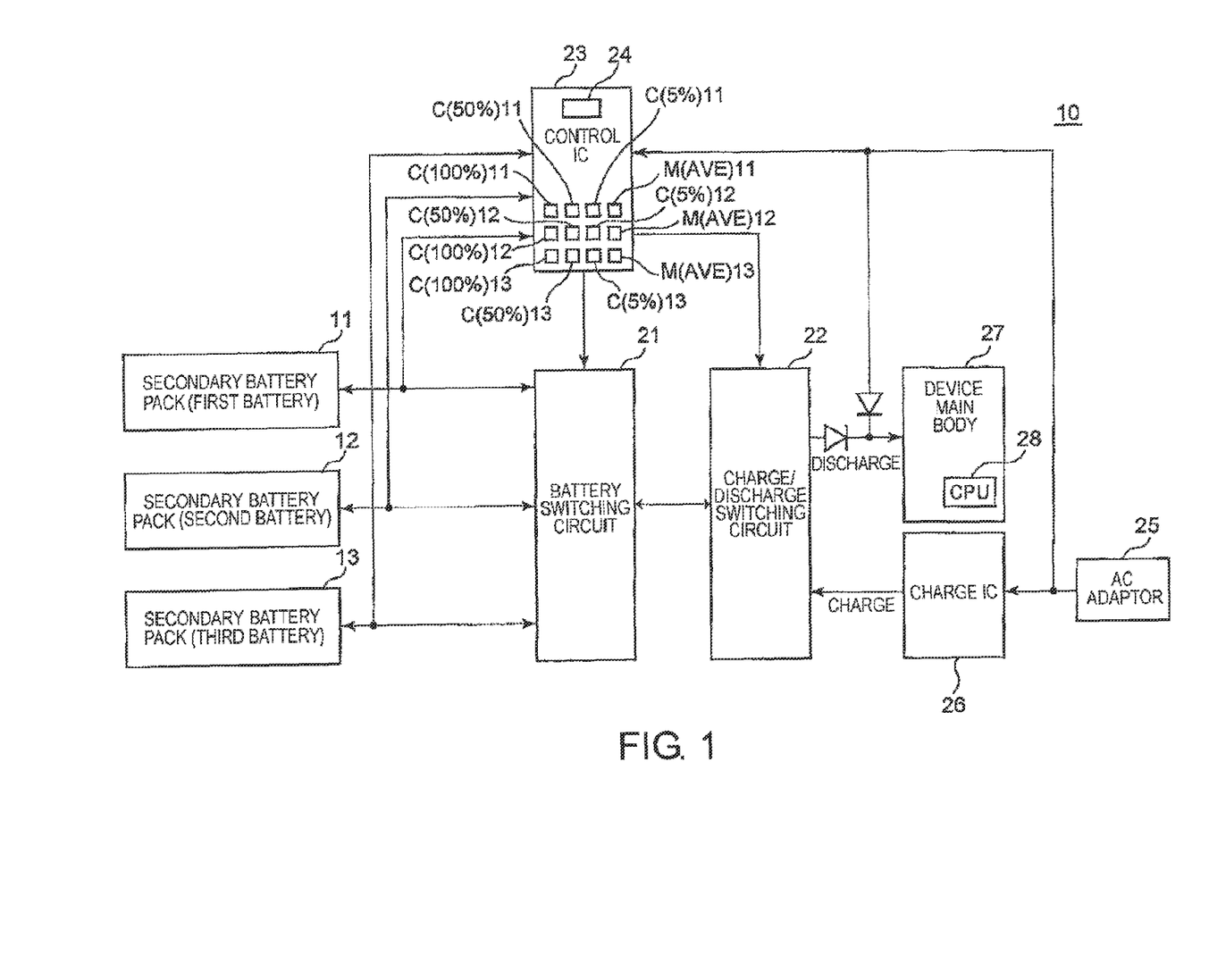
FIG. 1 is a block diagram of an information processing device according to a first embodiment of this invention.

Referring to FIG. 1, an information processing device 10 according to a first embodiment of this invention is illustrated. The information processing device 10 according to the first embodiment includes a plurality of secondary battery packs 11, 12, and 13, and a charge/discharge execution unit (part including 21, 22, and 23) for executing charge to the plurality of secondary battery packs 11, 12, and 13 and discharge from the plurality of secondary battery packs 11, 12, and 13. The secondary battery packs 11, 12, and 13 are also referred to as "first battery", "second battery", and "third battery", respectively, and are mounted in the information processing device 10. The charge/discharge execution unit (part including 21, 22, and 23) includes a battery switching circuit 21, a charge/discharge switching circuit 22, and a control integrated circuit (IC) 23.

The information processing device 10 further includes a device main body 27 as a load as a discharge target. The device main body 27 includes an IC and the like constituting an original function of the information processing device 10. The charge/discharge execution unit (part including 21, 22, and 23) executes, as the charge, charge to the plurality of secondary battery packs 11, 12, and 13 from an external power source (not shown), and executes, as the discharge, discharge from the plurality of secondary battery packs 11, 12, and 13 to the device main body 27. The external power source is an alternating current (AC) power source, namely a commercial power source.

The information processing device 10 further includes an AC adaptor 25 and a charge IC 26. The charge/discharge execution unit (part including 21, 22, and 23) executes, as the charge, charge to the plurality of secondary battery packs 11, 12, and 13 from the external power source (AC power source) via the AC adaptor 25 and the charge IC 26.

When executing the discharge, the charge/discharge execution unit (part including 21, 22, and 23) selects one of the plurality of secondary battery packs 11, 12, and 13 as a selected secondary battery pack based on the number of times of charge/discharge of each of the plurality of secondary battery packs 11, 12, and 13, and executes the discharge from the selected secondary battery pack.

Specifically, when executing the discharge, the charge/discharge execution unit (part including 21, 22, and 23) selects a secondary battery pack having the smallest number of times of charge/discharge among the plurality of secondary battery packs 11, 12, and 13 as the selected secondary battery pack, and executes the discharge from the selected secondary battery pack.

The charge/discharge execution unit (part including 21, 22, and 23) determines the number of times of charge/discharge of each of the plurality of secondary battery packs 11, 12, and 13 based on:

the number of times a fully-charged state (first detection point) of the secondary battery pack is detected when the charge to the secondary battery pack is executed;

the number of times an intermediate state (second detection point) in which the remaining capacity of the secondary battery pack becomes equal to a predetermined value (for example, 50%) between the maximum remaining capacity value (100%) in the fully-charged state and a remaining capacity of zero (0%) (in a remaining capacity zero state) is detected when the discharge from the secondary battery pack is executed; and the number of times a remaining capacity near-zero state (third detection point) in which the remaining capacity of the secondary battery pack becomes equal to a near-zero value (for example, 5%) closer to the remaining capacity of zero (0%) than the predetermined value (for example, 50%) is detected when the discharge from the secondary battery pack is executed.

Specifically, the charge/discharge execution unit (part including 21, 22, and 23) determines the number of times of charge/discharge of each of the plurality of secondary battery packs 11, 12, and 13 as a total value of:

the number of times the fully-charged state (first detection point) of the secondary battery pack is detected;

the number of times the intermediate state (second detection point) of the secondary battery pack is detected; and the number of times the remaining capacity near-zero state (third detection point) of the secondary battery pack is detected. Alternatively, as described later with reference to FIG. 2, the charge/discharge execution unit (part including 21, 22, and 23) determines the number of times of charge/discharge of each of the plurality of secondary battery packs 11, 12, and 13 as an average value obtained by dividing the total value by the number of three detection points, namely 3.

In this way, the charge/discharge execution unit (part including 21, 22, and 23) determines the number of times of charge/discharge of each of the plurality of secondary battery packs 11, 12, and 13, and, when executing the discharge, selects a secondary battery pack having the smallest number of times of charge/discharge among the plurality of secondary battery packs 11, 12, and 13, and executes the discharge from the selected secondary battery pack. By preferentially discharging the secondary battery pack having the smallest number of times of charge/discharge as described above, the progress states of degradation of the secondary battery packs 11, 12, and 13 caused by charge/discharge become as equal as possible.

Note that, the charge/discharge execution unit (part including 21, 22, and 23) may determine the number of times of charge/discharge of each of the plurality of secondary battery packs 11, 12, and 13 based on the number of times another intermediate state in which the remaining capacity of the secondary battery pack becomes equal to another predetermined value (for example, 75% or 25%) between the maximum remaining capacity value (100%) and the near-zero value (for example, 5%) is detected (which is described later as a second embodiment of this invention).

Now, a detailed description is given of the configuration of the information processing device 10 according to the first embodiment illustrated in FIG. 1.

In FIG. 1, three secondary battery packs 11, 12, and 13 are connected via a charge/discharge circuit (21 and 22) to the control IC 23 for controlling the charge/discharge of the secondary battery packs 11, 12, and 13. The control IC 23 has firmware 24 written therein, which has logic for determining a secondary battery pack to be preferentially discharged and is the feature of this invention.

FIG. 1 illustrates the state in which the three secondary battery packs 11, 12, and 13 are mounted in the information processing device 10, and each of the secondary battery packs 11, 12, and 13 is connected to the control IC 23. The control IC 23 has the function of controlling the charge/discharge of the secondary battery packs 11, 12, and 13 and the function of determining the usage priority of the three secondary battery packs 11, 12, and 13. Those functions are realized by the firmware 24 of the control IC 23.

The control IC 23 has also the following functions.

(1) The control IC 23 monitors whether or not the AC adaptor (power supply unit) 25 for charge has been connected to the AC power source. When the AC adaptor 25 is connected to the AC power source, the control IC 23 switches the charge/discharge switching circuit 22 to "charge". When the AC adaptor 25 is not connected to the AC power source, the control IC 23 switches the charge/discharge switching circuit 22 to "discharge". Whether or not the AC adaptor (power supply unit) 25 has been connected to the AC power source is determined by, for example, detecting a direct current (DC) output from the AC adaptor (power supply unit) to the charge IC 26.

(2) The control IC 23 detects the voltages of the first battery (secondary battery pack 11), the second battery (secondary battery pack 12), and the third battery (secondary battery pack 13), and grasps the remaining capacities of the respective batteries 11, 12, and 13 based on the voltages.

(3) The control IC 23 controls the battery switching circuit 21 to select one of the batteries 11, 12, and 13 to be connected to the charge/discharge switching circuit 22.

Further, the control IC 23 includes: a "full-charge detection counter for the secondary battery pack (first battery) 11" represented by "C(100%)11";

a "50%-detection counter for the secondary battery pack (first battery) 11" represented by "C(50%)11";

a "5%-detection counter for the secondary battery pack (first battery) 11" represented by "C(5%)11";

an "average value storage memory for the secondary battery pack (first battery) 11" represented by "M(AVE)11";

a "full-charge detection counter for the secondary battery pack (second battery) 12" represented by "C(100%)12";

a "50%-detection counter for the secondary battery pack (second battery) 12" represented by "C(50%)12";

a "5%-detection counter for the secondary battery pack (second battery) 12" represented by "C(5%)12";

an "average value storage memory for the secondary battery pack (second battery) 12" represented by "M(AVE)12";

a "full-charge detection counter for the secondary battery pack (third battery) 13" represented by "C(100%)13";

a "50%-detection counter for the secondary battery pack (third battery) 13" represented by "C(50%)13";

a "5%-detection counter for the secondary battery pack (third battery) 13" represented by "C(5%)13"; and an "average value storage memory for the secondary battery pack (third battery) 13" represented by "M(AVE)13". Those counters and memories are described later.

The secondary battery packs 11, 12, and 13 are used as a power source for operating the function of the device main body 27 in the information processing device 10. The secondary battery packs 11, 12, and 13 are used in the information processing device 10, such as a portable personal computer or a mobile phone. For portable use, the information processing device 10 is designed to monitor the remaining capacity of the mounted secondary battery pack. One primary factor necessary for detecting the remaining capacity of the secondary battery pack is the voltage of the secondary battery pack. The reason is that the voltage of the secondary battery pack fluctuates depending on the remaining capacity, which is well known to those skilled in the art. The voltage of the secondary battery pack is one factor necessary for detecting the remaining capacity, and it is also well known to those skilled in the art that some factors such as the temperature and current need to be combined for detecting the remaining capacity of the secondary battery pack more accurately. If necessary, other factors than the voltage may be detected to detect the remaining capacity of the secondary battery pack.

Now, a detailed description is given of the operation of the information processing device 10 according to the first embodiment illustrated in FIG. 1.

The configuration and method for detecting the remaining capacity of the secondary battery pack are a commonly-used technology, and hence detailed descriptions thereof are herein omitted. In the following, a method of equalizing the deteriorations of the three secondary battery packs 11, 12, and 13 illustrated in FIG. 1 is described with reference also to a flowchart of FIG. 2. The control IC 23 has also the following function.

Figure 2:
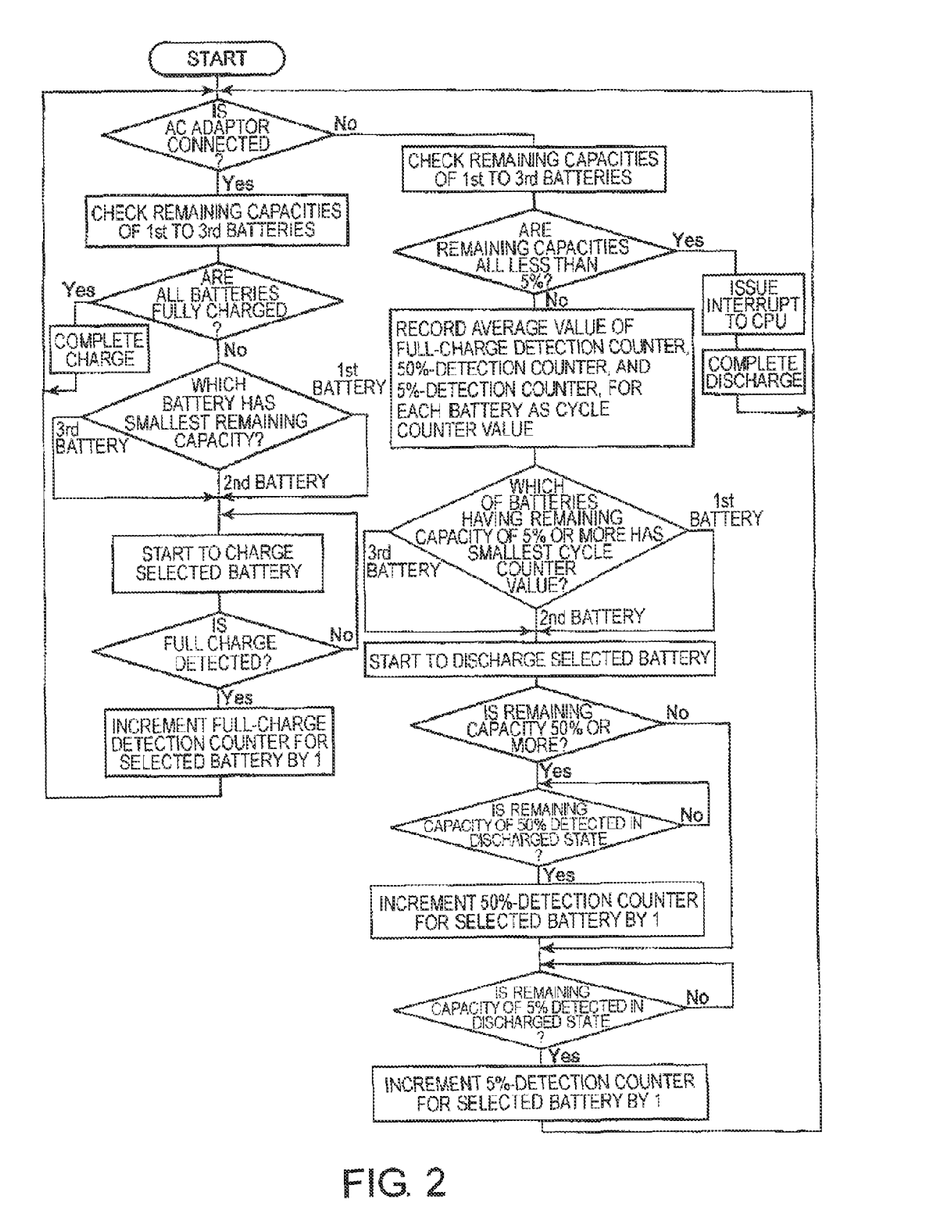
FIG. 2 is a flowchart illustrating an operation of the information processing device illustrated in FIG. 1.

As described above, the control IC 23 monitors whether or not the AC adaptor 25 for charge has been connected to the AC power source in an AC adaptor connection determining step (IS AC ADAPTOR CONNECTED?). When the AC adaptor 25 is connected to the AC power source, the control IC 23 switches the charge/discharge switching circuit 22 to "charge".

When the AC adaptor 25 is connected to the AC power source, the control IC 23 checks the remaining capacities of the first battery (secondary battery pack 11), the second battery (secondary battery pack 12), and the third battery (secondary battery pack 13) to determine whether or not all the batteries 11, 12, and 13 are fully charged. When all the batteries 11, 12, and 13 are fully charged, the control IC 23 completes the charge, and the processing returns to the AC adaptor connection determining step (IS AC ADAPTOR CONNECTED?). When not all the batteries 11, 12, and 13 are fully charged, the control IC 23 determines which of the first battery (secondary battery pack 11), the second battery (secondary battery pack 12), and the third battery (secondary battery pack 13) has the smallest remaining capacity, and selects the battery having the smallest remaining capacity as a selected battery. Note that, when three of the first battery (secondary battery pack 11), the second battery (secondary battery pack 12), and the third battery (secondary battery pack 13) have the same remaining capacity, the control IC 23 selects any one of the three batteries. Alternatively, also when two of the first battery (secondary battery pack 11), the second battery (secondary battery pack 12), and the third battery (secondary battery pack 13) have the same smallest value of the remaining capacity, the control IC 23 selects any one of the two batteries.

Figure 3:
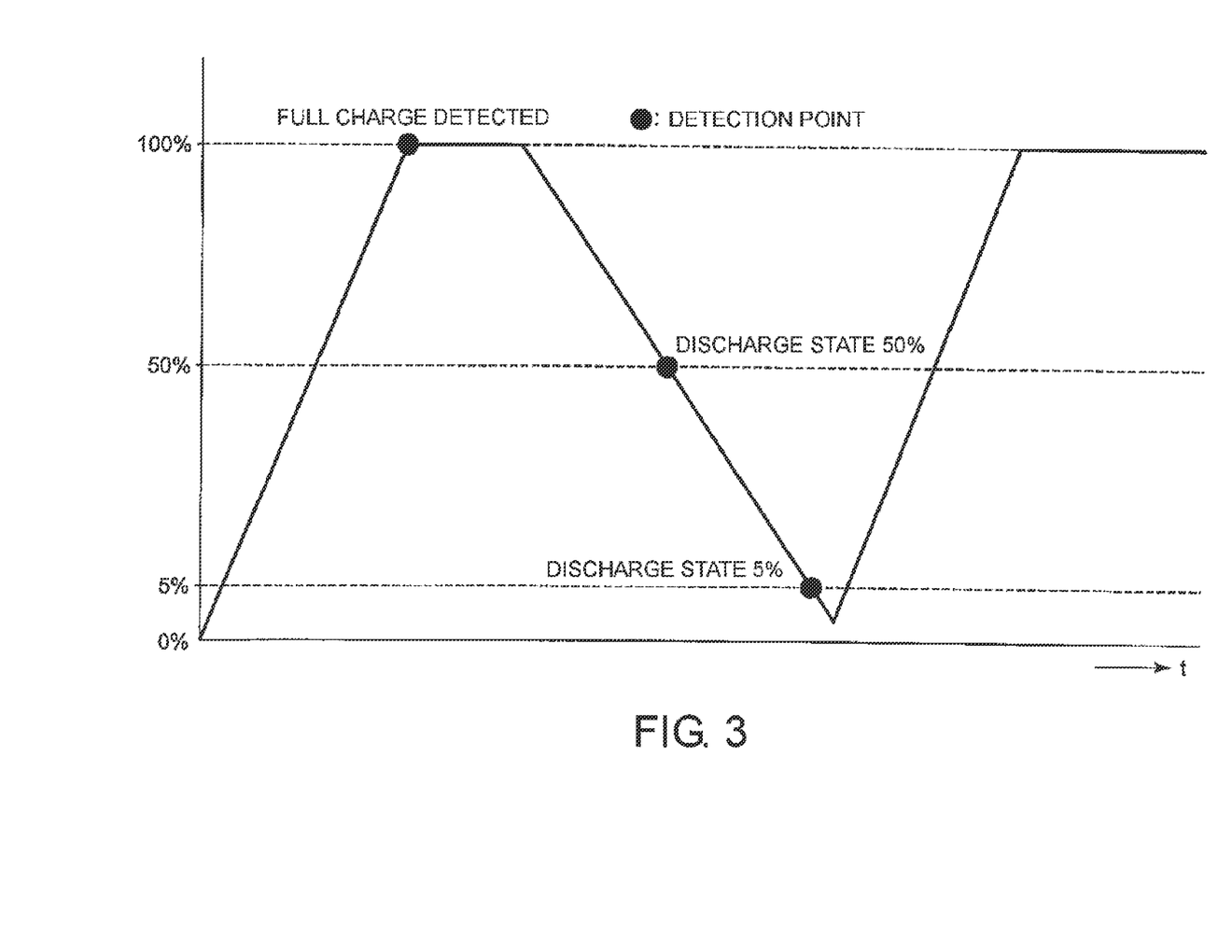
FIG. 3 is a graph showing the operation of the information processing device illustrated in FIG. 1.

Subsequently, the control IC 23 starts to charge the selected battery, and charges the selected battery until the full charge of the selected battery is detected. When the full charge of the selected battery is detected, the control IC 23 increments a full-charge detection counter for the selected battery by 1, and the processing returns to the AC adaptor connection determining step (IS AC ADAPTOR CONNECTED?). In this case, for example, if the selected battery is the first battery (secondary battery pack 11), the control IC 23 increments the full-charge detection counter represented by "C(100%)11" by 1. A detection point of "FULL-CHARGE DETECTION" is shown in FIG. 3. Note that, FIG. 3 is a graph showing the relationship between the remaining capacity of the secondary battery pack (vertical axis) and time t.

As described above, the control IC 23 monitors whether or not the AC adaptor 25 for charge has been connected to the AC power source in the AC adaptor connection determining step (IS AC ADAPTOR CONNECTED?). When the AC adaptor 25 is not connected to the AC power source, the control IC 23 switches the charge/discharge switching circuit 22 to "discharge".

In the AC adaptor connection determining step (IS AC ADAPTOR CONNECTED?), when the AC adaptor 25 is not connected to the AC power source, the control IC 23 checks the remaining capacities of the first battery (secondary battery pack 11), the second battery (secondary battery pack 12), and the third battery (secondary battery pack 13) to determine whether or not all the batteries 11, 12, and 13 have the remaining capacities of less than 5%. When all the batteries 11, 12, and 13 have the remaining capacities of less than 5%, the control IC 23 issues an interrupt to a central processing unit (CPU) 28 of the device main body 27 to complete the discharge. The CPU 28 controls the operation of the information processing device 10. When receiving the above-mentioned interrupt, the CPU 28 performs shutdown processing. When not all the batteries 11, 12, and 13 have the remaining capacities of less than 5%, the control IC 23 determines an average value obtained by dividing a total value of the count number of the full-charge detection counter, the count number of the 50%-detection counter, and the count number of the 5%-detection counter in each of the batteries 11, 12, and 13 by the number of three detection points, namely 3, and stores and records the average value in the average value storage memory as a cycle counter value. Note that, the total value instead of the average value may be stored and recorded in the same storage memory as the cycle counter value. The control IC 23 determines which of the first battery (secondary battery pack 11), the second battery (secondary battery pack 12), and the third battery (secondary battery pack 13) among the batteries having the remaining capacities of 5% or more has the smallest cycle counter value, and selects the battery having the smallest cycle counter value as a selected battery. The control IC 23 then starts to discharge the selected battery. Note that, when three of the first battery (secondary battery pack 11), the second battery (secondary battery pack 12), and the third battery (secondary battery pack 13) have the same cycle counter value, the control IC 23 selects any one of the three batteries. Alternatively, also when two of the first battery (secondary battery pack 11), the second battery (secondary battery pack 12), and the third battery (secondary battery pack 13) have the same smallest value of the cycle counter value, the control IC 23 selects any one of the two batteries.

Subsequently, the control IC 23 determines whether the remaining capacity of the selected battery is 50% or more, and when the remaining capacity of the selected battery is 50% or more, the control IC 23 determines whether or not the remaining capacity of 50% of the selected battery is detected in the discharged state. When the remaining capacity of 50% of the selected battery is detected in the discharged state, the control IC 23 increments the 50%-detection counter for the selected battery by 1, and the processing proceeds to a determination as to whether the remaining capacity of the selected battery is 5% or more.

In this case, for example, if the selected battery is the first battery (secondary battery pack 11), the 50%-detection counter represented by "C(50%)11" is incremented by 1. A detection point of the 50%-detection is shown in FIG. 3 as "DISCHARGED STATE 50%".

The control IC 23 determines whether the remaining capacity of the selected battery is 50% or more, and even when the remaining capacity of the selected battery is not 50% or more, the processing proceeds to the determination as to whether the remaining capacity of the selected battery is 5% or more. Then, when the remaining capacity of 5% of the selected battery is detected in the discharged state, the control IC 23 increments the 5%-detection counter for the selected battery by 1, and the processing returns to the AC adaptor connection determining step (IS AC ADAPTOR CONNECTED?).

In this case, for example, if the selected battery is the first battery (secondary battery pack 11), the 5%-detection counter represented by "C(5%)11" is incremented by 1. A detection point of the 5%-detection is shown in FIG. 3 as "DISCHARGED STATE 5%".

Figure 4:
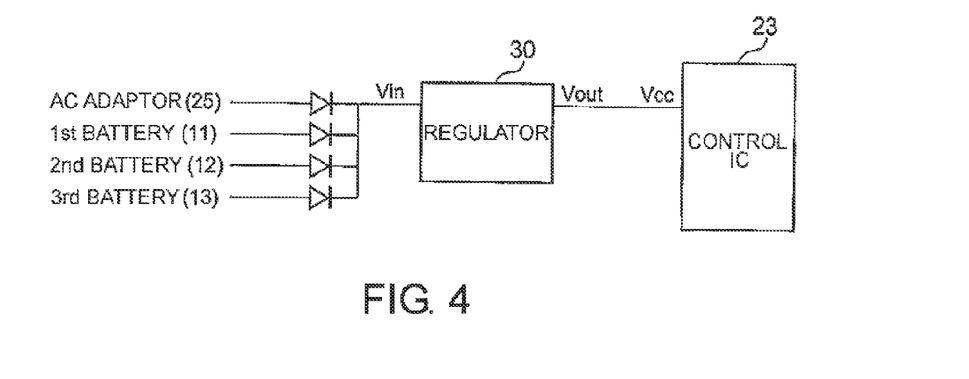
FIG. 4 is a block diagram illustrating a power supply circuit to a control IC in the information processing device illustrated in FIG. 1.

As illustrated in the flowchart of FIG. 2, the control IC 23 installs the counter function of counting the number of times when the three states (three detection points) are detected for each of the secondary battery packs 11, 12, and 13. One detection point is when the full charge (first detection point) is detected, another is when the battery remaining capacity of 50% in the discharged state (second detection point) is detected, and the other is when the battery remaining capacity of 5% in the discharged state (third detection point) is detected. FIG. 3 shows the three detection points. Next, an average value of the respective results of counting (as described above, the average value is obtained by dividing a total value of the "number of times the first detection point is detected", the "number of times the second detection point is detected", and the "number of times the third detection point is detected" by the number of three detection points, namely 3) is calculated, and the average value is recorded in the control IC 23 as a cycle counter value. Note that, the total value instead of the average value may be recorded in the control IC 23 as the cycle counter value. The deterioration per charge/discharge of the secondary battery pack is larger when the secondary battery pack is charged and discharged at, for example, the minimum and maximum remaining capacities of 0% and 100% than when the secondary battery pack is charged and discharged at the remaining capacities such as 50% and 100%. In other words, the degradation is more advanced when the charge and discharge are performed at the minimum and maximum remaining capacities even if the number of times of charge/discharge is the same, and because the above-mentioned cycle counter value is the average value (or the total value) of the three detection points, it is possible to discriminate that the deterioration is advanced more as the value becomes larger. Based on the cycle counter value, the control IC 23 appropriately determines a secondary battery pack to be preferentially discharged. As described above, in this embodiment, the counter function of counting the number of times of execution of charge/discharge for the plurality of secondary battery packs mounted in the information processing device is installed, and hence the function of preferentially discharging a less-deteriorated secondary battery pack can be realized. Referring to FIG. 4, a power supply circuit to the control IC 23 in the information processing device 10 illustrated in FIG. 1 is illustrated. Power of the control IC 23 is supplied from the battery 11, 12, or 13 or the AC adaptor 25. In actual fact, the power supply circuit to the control IC 23 has a diode-OR connection of the AC adaptor 25 and the batteries 11, 12, and 13, and the power is supplied to the control IC 23 from the AC adaptor 25 or the battery 11, 12, or 13 having the highest voltage via a regulator 30.

(Second Embodiment)

Next, a description is given of an information processing device according to a second embodiment of this invention.

Although the basic configuration of the second embodiment of this invention is as above, the following component may be added.

One example is as follows. The above-mentioned first embodiment has exemplified three detection points, namely the full-charge detection, the 50%-detection in the discharged state, and the 5%-detection in the discharged state, but by detecting the battery state more finely, a more accurate cycle counter value can be determined. For example, four detection points, namely the full-charge detection, a 66%-detection in the discharged state, a 33%-detection in the discharged state, and the 5%-detection in the discharged state, are detected. Alternatively, five detection points, namely the full-charge detection, a 75%-detection in the discharged state, the 50%-detection in the discharged state, a 25%-detection in the discharged state, and the 5%-detection in the discharged state are detected. The detection points may be determined as appropriate depending on the recording capacity of the control IC 23 or requirement specifications required for the information processing device 10.

While the invention of this application has been described in detail by way of the embodiments, the invention of this application is not limited to the above-mentioned embodiments. The configuration and details of the invention of this application can be subject to various modifications that are understandable to those skilled in the art within the scope of the invention of this application.

This application claims priority from Japanese Patent Application No. 2011-065367, filed on Mar. 24, 2011, the entire disclosure of which is incorporated herein by reference.

REFERENCE SIGNS LIST 10 information processing device
11 secondary battery pack (first battery)
12 secondary battery pack (second battery)
13 secondary battery pack (third battery)
21 battery switching circuit
22 charge/discharge switching circuit
23 control IC
24 firmware
25 AC adapter
26 charge IC
27 device main body
28 CPU
C(100%)11 full-charge detection counter for secondary battery pack (first battery) 11
C(50%)11 50%-detection counter for secondary battery pack (first battery) 11
C(5%)11 5%-detection counter for secondary battery pack (first battery) 11
M(AVE)11 average value storage memory for secondary battery pack (first battery) 11
C(100%)12 full-charge detection counter for secondary battery pack (second battery) 12
C(50%)12 50%-detection counter for secondary battery pack (second battery) 12
C(5%)12 5%-detection counter for secondary battery pack (second battery) 12
M(AVE)12 average value storage memory for secondary battery pack (second battery) 12
C(100%)13 full-charge detection counter for secondary battery pack (third battery) 13
C(50%)13 50%-detection counter for secondary battery pack (third battery) 13
C(5%)13 5%-detection counter for secondary battery pack (third battery) 13
M(AVE)13 average value storage memory for secondary battery pack (third battery) 13

The invention claimed is:

1. An information processing device, comprising:
a plurality of secondary battery packs; and
a charge and discharge execution unit for executing a charge to the plurality of secondary battery packs and a discharge from the plurality of secondary battery packs,
wherein the charge and discharge execution unit is configured to, when executing the discharge, select one of the plurality of secondary battery packs as a selected secondary battery pack based on a number of times each of the plurality of secondary battery packs has been charged and a number of times each of the plurality of secondary battery packs has been discharged, and execute the discharge from the selected secondary battery pack,
wherein the charge and discharge execution unit is configured to:
detect a fully-charged state of each of the plurality of secondary battery packs, when the charge to each of the plurality of secondary battery packs is executed, and to count a number of times of the detection of the fully-charged state;
detect an intermediate state in which a remaining capacity of the each of the plurality of secondary battery packs becomes equal to a predetermined value between a maximum remaining capacity value in the fully-charged state and a remaining capacity of zero, when the discharge from the each of the plurality of secondary battery packs is executed, and to count a number of times of the detection of the intermediate state; and
detect a remaining capacity near-zero state, in which the remaining capacity of the each of the plurality of secondary battery packs becomes equal to a near-zero value closer to a remaining capacity of zero than the predetermined value, when the discharge from the each of the plurality of secondary battery packs is executed and to count a number of times of the detection of the remaining capacity near-zero state; and
the charge and discharge execution unit is configured to determine the number of times each of the plurality of secondary battery packs has been charged and a number of times each of the plurality of secondary battery packs has been discharged based on the number of times of the detection of the fully-charged state, the number of times of the detection of the intermediate state, and the number of times of the detection of the remaining capacity near-zero state.

2. The information processing device according to claim 1, wherein the charge and discharge execution unit is configured to determine the number of times of charge and discharge of the each of the plurality of secondary battery packs based also on a number of times another intermediate state in which the remaining capacity of the each of the plurality of secondary battery packs becomes equal to another predetermined value between the maximum remaining capacity value and the near-zero value is detected and counted when the discharge from the each of the plurality of secondary battery packs is executed.

3. The information processing device according to claim 1, further comprising a device main body,
wherein the charge and discharge execution unit is configured to execute, as the charge, charge to the plurality of secondary battery packs from an external power source, and execute, as the discharge, discharge from the plurality of secondary battery packs to the device main body.

4. The information processing device according to claim 3, further comprising an AC adaptor,
wherein the charge and discharge execution unit is configured to execute, as the charge, charge to the plurality of secondary battery packs from the external power source via the AC adaptor.

5. The information processing device according to claim 1, wherein, when executing the discharge, the charge and discharge execution unit selects a secondary battery pack having a smallest number of times of charge and discharge among the plurality of secondary battery packs as the selected secondary battery pack, and executes the discharge from the selected secondary battery pack.

6. The information processing device according to claim 1, wherein the fully-charged state means a remaining capacity of the selected battery is 100%, and the remaining capacity near-zero state means a remaining capacity of the selected battery is 5%.

7. The information processing device according to claim 1, wherein the charge and discharge execution unit is configured to, when executing the charge, select a secondary battery pack having the smallest remaining capacity among the plurality of secondary battery packs, and executes the charge to the selected secondary battery pack having the smallest remaining capacity.

* * * * *

UNITED STATES PATENT AND TRADEMARK OFFICE
CERTIFICATE OF CORRECTION

PATENT NO. : 8,841,885 B2
APPLICATION NO. : 14/006878
DATED : September 23, 2014
INVENTOR(S) : Yukiyasu Ibe et al.

It is certified that error appears in the above-identified patent and that said Letters Patent is hereby corrected as shown below:

In the Specification

Column 8, Line 43: After "discharged." delete "As described....can be realized." and insert the same on Col. 8, Line 44 as a new paragraph.

Column 8, Line 49: After "realized." delete "Referring to......regulator 30." and insert the same on Col. 8, Line 50 as a new paragraph.

In the Claims

Column 107, Line 11: Claim 1, delete "to each" and insert -- to the each --.

Signed and Sealed this
Twenty-fourth Day of March, 2015

Michelle K. Lee
*Director of the United States Patent and Trademark Office*